(12) United States Patent
Xu et al.

(10) Patent No.: US 10,091,823 B2
(45) Date of Patent: Oct. 2, 2018

(54) CALL COLLISION PROCESSING METHOD, TERMINAL AND TRANSFER PLATFORM

(71) Applicant: Hytera Communications Corp., Ltd., Shenzhen, Guangdong (CN)

(72) Inventors: Yan Xu, Guangdong (CN); Chia Han Siong Samuel, Guangdong (CN); Yingzhe Zhang, Guangdong (CN)

(73) Assignee: Hytera Communications Corporation Limited, Shenzhen, Guangdong (CN)

(*) Notice: Subject to any disclaimer, the term of this patent is extended or adjusted under 35 U.S.C. 154(b) by 233 days.

(21) Appl. No.: 14/910,638

(22) PCT Filed: Aug. 13, 2013

(86) PCT No.: PCT/CN2013/081336
§ 371 (c)(1),
(2) Date: Feb. 5, 2016

(87) PCT Pub. No.: WO2015/021588
PCT Pub. Date: Feb. 19, 2015

(65) Prior Publication Data
US 2016/0183307 A1   Jun. 23, 2016

(51) Int. Cl.
*H04W 74/08* (2009.01)
*H04J 3/16* (2006.01)
*H04W 84/04* (2009.01)

(52) U.S. Cl.
CPC ....... *H04W 74/0841* (2013.01); *H04J 3/1694* (2013.01); *H04W 74/08* (2013.01); *H04W 84/047* (2013.01)

(58) Field of Classification Search
CPC ............. H04W 74/0841; H04W 74/08; H04W 84/047; H04J 3/1694
See application file for complete search history.

(56) References Cited

U.S. PATENT DOCUMENTS 5,446,462 A    8/1995  Cleveland
5,546,443 A *  8/1996  Raith .................... H04W 48/12
                                                        455/449

(Continued)

FOREIGN PATENT DOCUMENTS

CN    102917378 A    2/2013
CN    103139792 A    6/2013

(Continued)

OTHER PUBLICATIONS

International Search Report for International Application No. PCT/CN2013/081336 dated May 28, 2014.

(Continued)

*Primary Examiner* — Christine Ng
(74) *Attorney, Agent, or Firm* — Wolf, Greenfield & Sacks, P.C.

(57) ABSTRACT

A call collision processing method, a terminal and a repeater are disclosed according to the disclosure. The method includes: sending, by a terminal, an access request to a repeater, where the access request includes a preset number of access request bursts; monitoring, by the terminal, a channel state of the repeater, and determining, by the terminal, whether the repeater transfers the access request burst within a preset period of monitoring time; sending, by the terminal, subsequent bursts to the repeater if the repeater successively transfers the access request bursts of the terminal for at least two times within the preset period of monitoring time; and stopping sending, by the terminal, the subsequent bursts to the repeater if the repeater successively transfers access request bursts of another terminal for at least two times within the period of the preset monitoring time.

6 Claims, 12 Drawing Sheets

(56) References Cited

U.S. PATENT DOCUMENTS

| | | | |
|---|---|---|---|
| 8,406,120 B1* | 3/2013 | Sandhu | H04W 24/04 370/216 |
| 2001/0031646 A1* | 10/2001 | Williams | H04B 7/2612 455/560 |
| 2004/0264404 A1* | 12/2004 | Zegelin | H04L 63/0492 370/328 |
| 2007/0280262 A1 | 12/2007 | Larsen et al. | |
| 2008/0123682 A1 | 5/2008 | Yackooski et al. | |
| 2013/0070699 A1* | 3/2013 | Diachina | H04W 72/14 370/329 |

FOREIGN PATENT DOCUMENTS

| | | |
|---|---|---|
| CN | 103402030 A | 11/2013 |
| EP | 0401974 A2 | 12/1990 |
| EP | 0401974 A3 | 12/1990 |
| EP | 2394536 A1 | 12/2011 |
| WO | WO 98/42096 A2 | 9/1998 |
| WO | WO 98/42096 A3 | 9/1998 |
| WO | WO 2009/112080 A1 | 9/2009 |

OTHER PUBLICATIONS

Extended European Search Report, dated Sep. 29, 2016, from related European Application No. 13891445.2.

* cited by examiner

CALL COLLISION PROCESSING METHOD, TERMINAL AND TRANSFER PLATFORM

FIELD

The present disclosure relates to the technical field of communication, in particular to a call collision processing method, a terminal and a repeater.

BACKGROUND

In a conventional time division communication system, there is a long call delay when a terminal establishes a call via a repeater, and the call of the terminal can not be detected during the call delay. In a case that during the call delay, another terminal tries to access the repeater to establish a call, a call collision occurs in an uplink channel, thereby resulting in a call loss and degrading the user experience.

For example, user A initiates a group call through terminal A to inquire who is going for lunch, and users B and C want to respond to the call. If user C request an access to a repeater through terminal C when user B requests an access to the repeater through terminal B to establish a call with terminal A, a call collision may occur between terminal B and terminal C. In this case, the repeater can not transfer a call from terminal B or terminal C to terminal A normally, thus no response is returned to user A.

SUMMARY

A call collision processing method, a terminal and a repeater are provided according to the present disclosure, to avoid a call collision in conventional technology.

In a first aspect, a call collision processing method is provided according to an embodiment of the disclosure, which includes:

sending, by a terminal, an access request to a repeater, where the access request includes a preset number of access request bursts;

monitoring, by the terminal, a channel state of the repeater, and determining, by the terminal, whether the repeater transfers the access request burst within a preset period of monitoring time;

sending, by the terminal, subsequent bursts to the repeater if the repeater successively transfers the access request bursts of the terminal for at least two times within the preset period of monitoring time; and stopping sending, by the terminal, the subsequent bursts to the repeater if the repeater successively transfers access request bursts of another terminal for at least two times within the preset period of monitoring time.

In a second aspect, a call collision processing method is provided according to an embodiment of the disclosure, which includes:

receiving, by a repeater, an access request burst sent by at least one terminal, and determining, by the repeater, a burst to be transferred and a corresponding terminal to be transferred based on a signal strength of the access request burst;

transferring, by the repeater, the burst to be transferred, and determining, by the repeater, whether the repeater receives a new access request burst within a time division multiple access period;

transferring, by the repeater, a new access request burst of the terminal to be transferred if the repeater receives the new access request burst of the terminal to be transferred within the preset time division multiple access period;

transferring, by the repeater, a new access request burst of another terminal if the repeater receives the new access request of the another terminal within the preset time division multiple access period; and transferring, by the repeater, the burst to be transferred repeatedly, if the repeater does not receive a new access request burst within the time division multiple access period and the time division multiple access period is exceeded.

In a third aspect, a terminal is provided according to an embodiment of the disclosure, which includes:

a sending unit, configured to send an access request to a repeater, where the access request includes a preset number of access request bursts; and a first determining unit, configured to monitor a channel state of the repeater and determines whether the repeater transfers the access request burst of the terminal within a preset period of monitoring time, where the sending unit sends subsequent bursts to the repeater if the repeater successively transfers the access request bursts of the terminal for at least two times within the preset period of monitoring time, and the sending unit stops sending the subsequent bursts to the repeater if the repeater successively transfers access request bursts of another terminal for at least two times within the preset period of monitoring time.

In a fourth aspect, a repeater is provided according to an embodiment of the disclosure, which includes:

a receiving unit, configured to receive an access request burst sent by at least one terminal and determine a burst to be transferred and a corresponding terminal to be transferred based on a signal strength of the access request burst;

a transferring unit, configured to transfer the burst to be transferred determined by the receiving unit; and a first determining unit, configured to determine whether the receiving unit receives a new access request burst within a time division multiple access period, notify the transferring unit to transfer a new access request burst of the terminal to be transferred if the receiving unit receives the new access request burst of the terminal to be transferred within the time division multiple access period, notify the transferring unit to transfer a new access request burst of another terminal if the receiving unit the receives the new access request burst of the another terminal within the time division multiple access period, and notify the transferring unit to transfer the burst to be transferred repeatedly, if the receiving unit does not receive a new access request burst within the time division multiple access period and the time division multiple access period is exceeded.

As can be seen from the technical solutions above, when requesting for the access to the repeater, the terminal gives a period of time to the repeater for processing, rather than simply sending all bursts to the repeater, and determines whether to send the subsequent bursts based on a response of the repeater. If the terminal detects that the repeater successively transfers bursts of the terminal for at least two times within the preset period of monitoring time, it is determined that the terminal is allowed to access the repeater. If the terminal detects that the repeater successively transfers bursts of another terminal for at least two times within the preset period of monitoring time, it is determined that the terminal is rejected to access the repeater. Thus, a possible call collision among multiple terminals is avoided.

BRIEF DESCRIPTION OF THE DRAWINGS

The drawings are used to provide a further understanding of the disclosure and forms a part of the specification in conjunction with the embodiment, which do not limit the disclosure.

DETAILED DESCRIPTION

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

Operation processes of four kinds of conventional time division communication systems are described briefly.

The first kind of conventional time division communication system is a common repeater communication system.

The common repeater communication system has a synchronization mode, in which a base station (BS) establishes a benchmark for time sequence, and a mobile station MS synchronizes with the BS. If the BS is in a sleeping state in which the BS does not perform a transmission, for accessing the communication system, an MS needs to send a base station activation (BS Active) signaling to the BS in an asynchronous way to activate the BS. Then, the BS sends an idle frame to the MS, so that the MS is synchronized and sends subsequent bursts.

After the BS is activated, a call collision may occur when multiple MSs initiate call requests to the BS at the same time no matter whether a channel is in an idle state or a call hang time state. In this case, a downlink signal can not be timely detected in a polite channel access mode, thus the call collision can not be avoided. In the polite channel access mode a terminal initiates a call request to a base station only when the channel is idle (i.e., the channel is in the idle state or the call hang time state). In contrast, in the impolite channel access mode, a terminal initiates a call request no matter whether the channel is currently idle or occupied.

Figure 1:
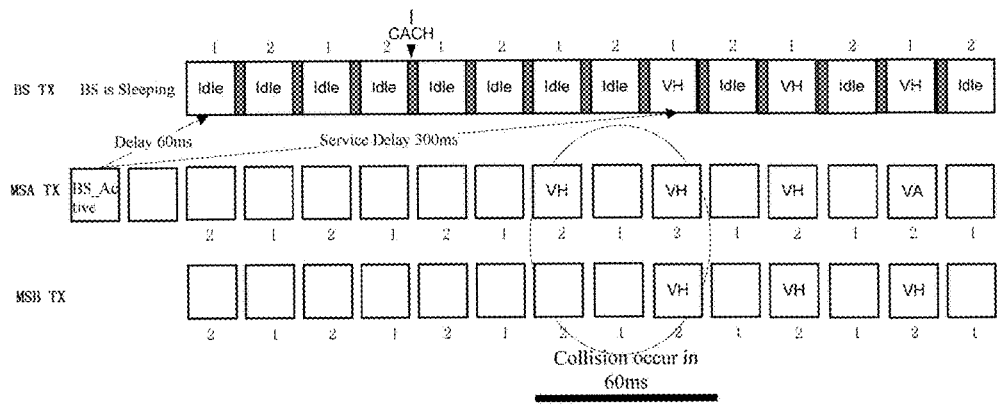
FIG. 1 is a sequence diagram of a conventional common repeater communication system in which a call collision occurs.

Referring to the sequence diagram in FIG. 1, the BS establishes a benchmark for time sequence, and MSA and MSB both may synchronize with the BS. Thus, MSA and MSB may initiate call request bursts (a voice transmission is taken as an example in FIG. 1 and a call request burst corresponding thereto is a voice header VH) at a same time point (i.e., a period point in a TDMA mode). For example, a call delay of the system is 60 ms, and MSB may also initiate a call request to the BS during the call delay after MSA initiates a call request. Thus, a call collision occurs between MSA and MSB during the call delay, i.e., the call collision occurs within the ellipse shown in FIG. 1.

The second kind of conventional time division communication system is a fast-activated repeater communication system.

The fast-activated repeater communication system has a synchronization way in which an MS establishes a benchmark for time sequence and a BS synchronizes with the MS. If the BS is in a sleeping state in which the BS does not perform a transmission, the BS may establish a downlink channel by synchronizing a downlink channel of the BS with an uplink channel of the MS periodically to avoid activating the BS. In other words, in a case that the BS needs to be activated, instead of sending a base station activation signaling to the BS and waiting for the establishment of the downlink channel as in the common repeater communication system, the BS may be activated to transfer a call request from the MS, once the MS initiates a request to the BS.

Similarly, after the BS is activated, the call collision may occur when multiple MSs initiate call requests to the BS at the same time (the same time does not emphasize simultaneousness of occurrence), no matter whether a channel is in an idle state or a call hang time state. Compared with the solution of establishing a benchmark of a time sequence by the BS, the call collision is more severe in the solution of establishing a benchmark of a time sequence by the MS. The reason for the more severe collision is that when the BS is in the sleeping state, multiple MSs initiate call requests to the BS based on respective time sequences, so that the multiple MSs can not detect a sequence collision in a timely manner, and sequences of the multiple MSs are chaotic and random.

Figure 2:
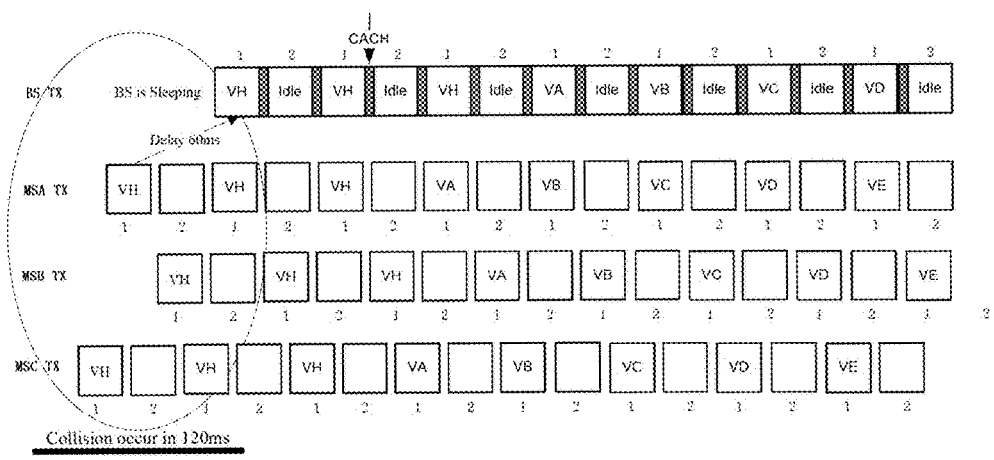
FIG. 2 is a sequence diagram of a conventional fast-activated repeater communication system in which a call collision occurs.

Referring to the sequence diagram in FIG. 2, MSA, MSB and MSC establish respective benchmarks of time sequence. After MSA initiates a call request to the BS, the BS is activated and synchronizes with MSA. Since the three terminals are not synchronized, the three terminals may not initiate call request bursts (a voice transmission is taken as an example in FIG. 2 and a call request burst corresponding thereto is a voice header VH) to the BS at a same time point. For example, a call delay of the system is 60 ms, and MSB and MSC can not detect a collision of time sequences in a timely manner after MSA initiates a call request. Thus, MSB and MSC may initiate call requests to the BS based on respective time sequences, which results in continuous collisions and interferences between subsequent calls, thereby aggravating the call collision.

The third conventional time division communication system is a simulcast communication system.

The simulcast communication system has a synchronization mode, in which a BS establishes a benchmark for time sequence and a MS synchronizes with the BS. If the BS is in a sleeping state in which the BS does not perform a transmission, for accessing the communication system, an MS needs to send a base station activation (BS Active) signaling to the BS in an asynchronous way to activate the BS. Then, the BS sends an idle frame to the MS, so that the MS is synchronized and sends subsequent bursts.

In order to enlarge coverage of the system, multiple repeaters are connected to a control center in the simulcast communication system. The multiple repeaters transfer respective received call requests to the control center, and the control center unifiedly controls the multiple repeaters to transfer the call requests at the same time (the same time herein indicates simultaneousness). In a case that the multiple repeaters each are controlled to transfer one call request at the same time, there is a simulcast delay relative to the time instant that the repeater receives the call request. The simulcast delay is greater than the call delay in the common communication system, where the simulcast delay is greater than or equal to 180 ms and is smaller or equal to 1 s.

No matter whether the channel is in an idle state or a call hang time state, different channel devices (i.e., repeaters) may receive call requests from multiple MSs at different time points during the simulcast delay. However, only a call request from one MS is transferred through a downlink channel under the control of the control center and the multiple MSs can not know which one of the call requests is transferred by the system in advance, which causes a most severe call collision and a higher call loss rate (the call loss rate is a ratio of lost calls to total calls).

Figure 3:
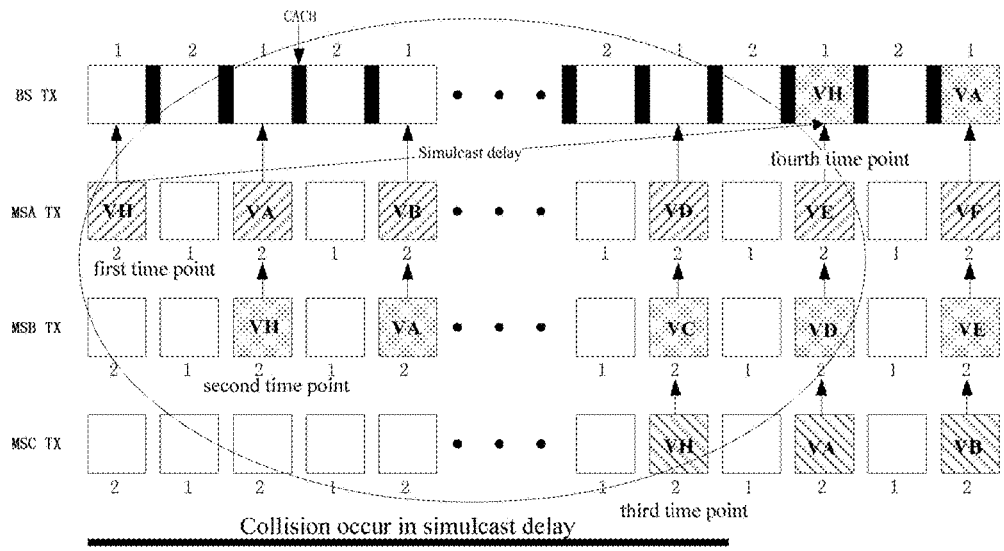
FIG. 3 is a sequence diagram of a conventional simulcast communication system in which a call collision occurs.

Referring to the sequence diagram in FIG. 3, the BS establishes a benchmark for time sequence, and MSA, MSB and MSC are about to synchronize with the BS, thus the MSA, MSB and MSC may initiate call request bursts at a same time point (a voice transmission is taken as an example in FIG. 3 and a call request burst corresponding thereto is a voice header VH). As shown in FIG. 3, the MSA initiates a call request to the BS at a first time point, the MSB initiates a call request to the BS at a second time point, the MSC initiates a call request to the BS at a third time point, and the BS transfers the call request from the MSB at a fourth time point under the control of the control center. For the MSA, the time interval between the first time point and the fourth time point is the simulcast delay. As shown in FIG. 3, the call collision among the three MSs occurs during the simulcast delay.

The fourth kind of conventional time division communication system is a trunking communication system.

In the trunking communication system, a centralized trunking mode is generally used, a terminal communicates with a control center through a control channel, and the terminal monitors the control channel through channel assigning instructions. For initiating a group call, an MS needs to send a request for assigning a channel, and then the control center may notify a member of the group call to switch to a service channel assigned to the member (the service channel corresponds to a repeater which is assigned to the member of the group and is configured to transfer bursts), to establish the group call through the service channel. In this case, if the channel is in a call hang time state, a call collision may occur when multiple members of the group initiate callbacks. Similarly, in a distributed trunking communication system, a call collision may occur when multiple members initiate callbacks if the service channel is in a call hang time state.

Two states of a channel, i.e., the idle state and the call hang time state, are mentioned in describing the four kinds of conventional communication systems, and the two states are described hereinafter.

In a case that that a channel is in the idle state or the call hang time state, a calling user is not on a call with a called user. The idle state indicates that the channel is not occupied and the repeater sends an idle frame to a user. The call hang time state indicates that a call between the calling user and the called user is just ended and the repeater reserves a communication channel for the calling user and the called user for a period of time. The period of time is called as a call holding time, and the repeater reserves the communication channel for the calling user and the called user by transferring a call ending frame (the last frame sent by the calling user). It should be noted that the terminal can query whether the channel is currently in the idle state or the call hang time state based on timeslots and timeslot states carried in a Common Announcement Channel (CACH) as shown in FIGS. 1, 2 and 3 and based on which one of the idle frame and the call ending frame is transferred by the repeater. A general process for the query includes: determining whether the channel is occupied based on the timeslot states, and if the channel is not occupied, determining whether the channel is in the idle state or the call hang time state based on which one of the idle frame and the call ending frame is transferred by the repeater.

In addition, as can be seen from FIGS. 1, 2 and 3, the four kinds of systems have different degrees of call collision due to respective system configuration, but the four kinds of systems have a same problem: in a case that a call is required by a user, a terminal may determine whether the channel is occupied before initiating a call, but the terminal can not accurately determine the usage state of the channel during a call delay. The reason for the inaccurate determination is that the terminal queries occupation state of the channel based on information carried by CACH of the base station, the base station may not detect a call initiated by another terminal during the call delay, information fed by the base station to the terminal through the CACH indicates that the terminal is currently allowed to access to the base station, and the terminal may initiate a call to the base station based on the information, thereby a call collision may occur. Besides, as showing in the figures, in the conventional technology, if the terminal starts requesting an access to the base station, the terminal may send all bursts to the base station, no matter whether the access is allowed by the based station, which also cause the call collision.

The technical solutions according to the disclosure is to avoid the call collision during the call delay. In the technical solutions according to the disclosure, a terminal monitors the channel state of the repeater after sending an access request and determines whether to send subsequent bursts based on the channel state of the repeater and the repeater transfers an access request with a highest signal strength. The call collision is avoided by cooperation between the terminal and the repeater, which is described hereinafter.

The First Embodiment

Figure 4:
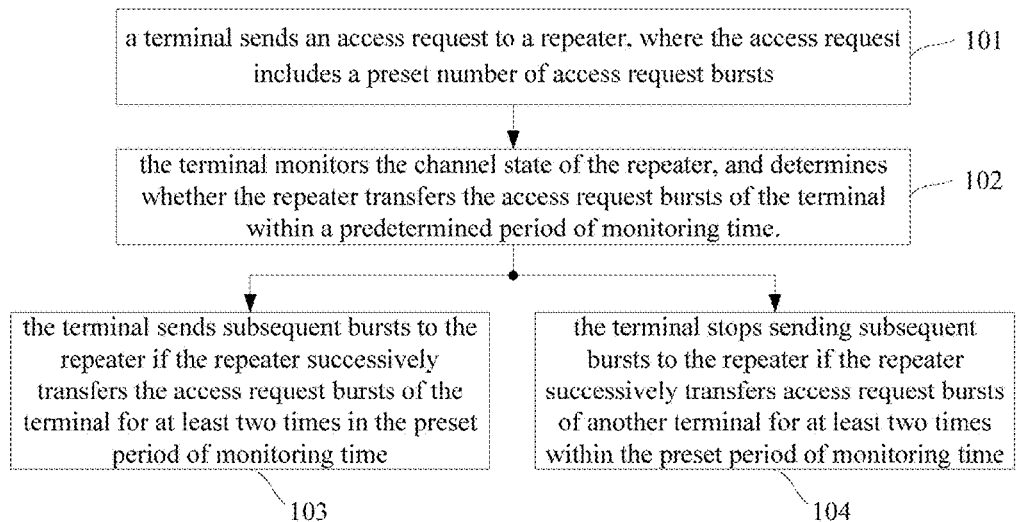
FIG. 4 is a flowchart of a first embodiment of a call collision processing method of a terminal according to the disclosure.

FIG. 4 is a flowchart of a first embodiment of a call collision processing method of a terminal according to the disclosure. The method includes steps 101 to 104.

In step 101, a terminal sends an access request to a repeater, where the access request includes a preset number of access request bursts.

The technical solutions according to the present disclosure are mainly applied in a time division multiple access system, and the terminal may be a device which supports the time division multiple access communication technology, such as an interphone or a smart phone. The interphone is taken as an example for illustrating the implementation process of step 101.

A user may initiate a voice call, a short message call or a signaling call by using the interphone, where the short message call and the signaling call can be collectively called as a data call. For the voice call and the data call, the terminal sends respective access request bursts to the repeater. For the voice call, the access request bursts are voice headers VH, and for the data call, the access request bursts are pre-carrier waves.

Generally, in order to improve a battery lifetime of the terminal, the terminal enters into a sleeping mode in a case that the terminal does not send and receive for a period of time. To activate the terminal and improve a success rate of a transmission service of the terminal, in a complete sending process, the terminal used as a sender is required to send M voice headers or pre-carrier waves before sending data to the repeater. The terminal is also required to send M voice headers or pre-carrier waves before sending data when the terminal is scanning. It should be noted that the distribution of the M voice headers or pre-carrier waves is that: the number of voice headers or pre-carrier waves included in the access request is a preset number N, the number of voice headers or pre-carrier waves transferred by the repeater in the monitoring process is (T/t) and the number of voice headers or pre-carrier waves included in the subsequent bursts is Y.

Taking the voice call as an example, the terminal may send an access request including N VHs after a user presses the dial key of the terminal, where N inclusively ranges from 1 to 3. The range of N may vary with the development of technology or vary to adapt to user requirement, which does not affect the technical solutions according to the present disclosure. In other words, the number of access request bursts included in the access request does not affect the effect of the method on avoiding a call collision.

In a preferred embodiment of the disclosure, the terminal may send the access request to the repeater in a polite access mode, that is, the terminal queries the channel state of the repeater through the CACH after the user presses the dial key and then sends the access request including N VHs to the repeater in a case the channel state is the idle state or the call hang time state.

In step 102, the terminal monitors the channel state of the repeater, and determines whether the repeater transfers the access request bursts of the terminal within a predetermined period of monitoring time.

As different from the conventional technology, instead of sending subsequent bursts, the terminal according to the present disclosure monitors the channel state of the repeater after sending the N access request bursts, so that whether the terminal is currently allowed to access the repeater can be determined according to the channel state, thereby avoiding the call collision.

The preset period of monitoring time according to the present disclosure may vary in different application scenarios. For example, in an application of an Internet Protocol (IP) interconnection system, the preset period of monitoring time includes a network delay, i.e., the preset period of monitoring time is equal to a preset delay plus the network delay. In an application of a simulcast system, the preset period of monitoring time includes a simulcast delay, i.e., the preset period of monitoring time is equal to the preset delay plus the simulcast delay.

It should be noted that a length of the preset period of monitoring time may affect a channel accessing time, and the channel accessing time may be understood as a period of time between an instant that the user performs an operation on the terminal and an instant that the user perceives a response to the operation (which may be allowance or rejection of the operation). In a case the channel accessing time is too long, the user experience may be affected. Thus, whether extra channel accessing time may be caused should be taken into account in setting the preset period of monitoring time.

In step 103, the terminal sends subsequent bursts to the repeater if the repeater successively transfers the access request bursts of the terminal for at least two times in the preset period of monitoring time.

After the determination in step 102, if the channel state indicates that the repeater performs a processing operation within the preset period of monitoring time, and the processing operation is a response to the terminal, the terminal may determine that the access to the repeater is allowed, and the terminal may send subsequent bursts, which indicates that the repeater rejects an access request from other terminal.

Specially, the operation of the repeater in response to the terminal is that the terminal detects that the repeater successively transfers the access request bursts of the terminal for at least two times in the preset period of monitoring time. Since for two successive transfers, the repeater may transfer access request bursts from two terminals, if the terminal is allowed to access the repeater in a case that the repeater transfers the access request burst from the terminal for one time, a sending collision between the two terminals may be caused. Thus, to avoid continuous call collisions caused by allowing two terminals to access the repeater, in the disclosure, it is determined that the terminal is allowed to access the repeater in a case the terminal detects that the repeater successively transfers the access request bursts of the terminal for at least two times within the preset period of monitoring time.

In addition, it should be noted that there may be following two cases that the terminal is allowed to access the repeater.

The first case is that only the terminal requests an access to the repeater at the current instant and a signal strength of the access request burst sent by the terminal meet a requirement of the repeater, in this case the terminal is allowed to access the repeater.

The second case is that multiple terminals request accesses to the repeater at the current instant, and a signal strength of the access request burst sent by the terminal is the highest and can cover access request bursts of the other terminals, in this case the terminal is allowed to access the repeater.

In step 104, the terminal stops sending subsequent bursts to the repeater if the repeater successively transfers access request bursts of another terminal for at least two times within the preset period of monitoring time.

As similar to step 103, the repeater also performs processing after receiving the access request burst, but the repeater does not respond to the terminal. If the terminal detects that the repeater successively transfers bursts of another terminal for at least two times, it is indicated that another terminal is allowed to access the repeater and the terminal is rejected to access the repeater. In this case, the terminal can terminate the sending subsequent bursts, to avoid a collision with a terminal currently allowed to access the repeater, thereby avoiding a call collision.

Figure 5:
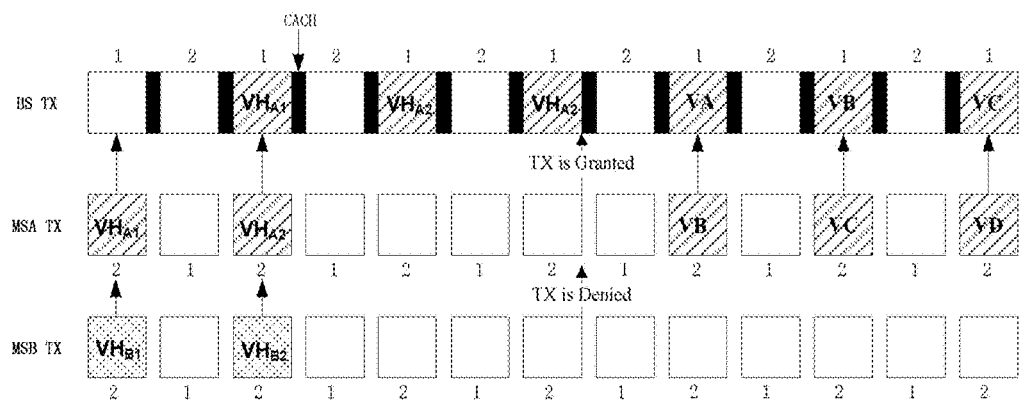
FIG. 5 is a sequence diagram in a first implementation of a call collision processing method according to the present disclosure.

The implementation according to the first embodiment of the disclosure is described in detail in conjunction with the example shown in FIG. 5.

MSA and MSB each need initiate a call currently, and each of access requests of MSA and MSB includes 2 VHs. Up arrows in FIG. 5 represent transmission. As can be seen from FIG. 5, at a same time division multiple access period point, MSA sends $VH_{A1}$ and MSB sends $VH_{B1}$; and similarly, at a next time division multiple access period point, MSA sends $VH_{A2}$ and MSB sends $VH_{B2}$. MSA is closer to the repeater than MSB, the repeater detects a signal from MSA and starts transferring $VH_{A1}$ and $VH_{A2}$ (subsequently, the repeater transfers $VH_{A2}$ repeatedly in a case the repeater does not detect a signal of MSA within the time division multiple access period, which is described hereinafter and is not described herein) through a downlink channel for transferring. When MSA monitors the repeater after sending $VH_{A2}$, MSA monitors that the repeater successively transfers two $VH_{A2}$s, in this case, MSA can determined that an access to the repeater is allowed, and can send subsequent bursts VA, VB, VC, VD and so on (VA is Voice A Burst, VB is Voice A Burst, VC is Voice C Burst, VD is Voice D Burst and so on) to the repeater. Accordingly, after sending $VH_{B1}$ and $VH_{B2}$, MSB monitors that the repeater successively transfers bursts of MSA for two times. MSB can determine that MSA is currently allowed to access the repeater, and the access of MSB to repeater is rejected. Thus, MSB can stop subsequent transmission, to avoid a call collision with MSA.

Figure 6:
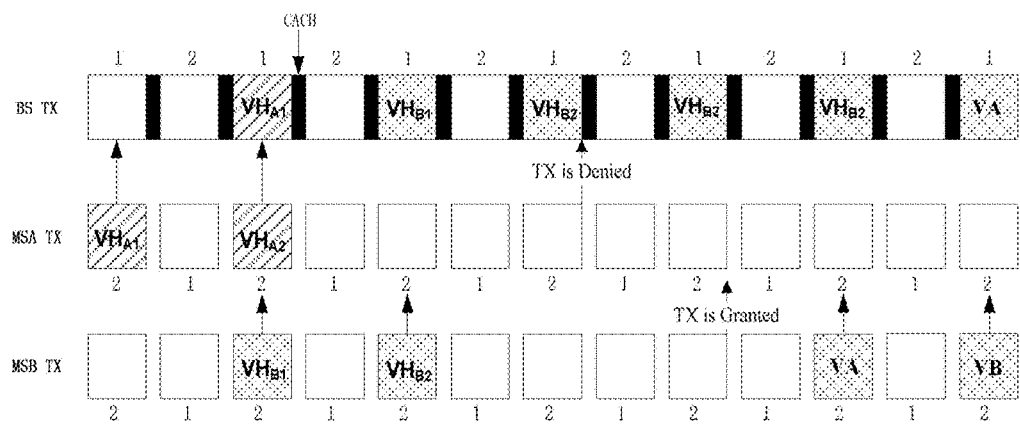
FIG. 6 is a sequence diagram in a second implementation of a call collision processing method according to the present disclosure.

FIG. 6 illustrates a case that there is a time division multiple access period between instants that two terminals initiate calls respectively. As can be seen from FIG. 6, no other terminal sends a burst to a repeater when MSA sends $VH_{A1}$ to the repeater, and the repeater can only detect $VH_{A1}$ and starts to transfer $VH_{A1}$ through a downlink channel for transferring. When MSA sends $VH_{A2}$ at a next time division multiple access period, MSB sends $VH_{B1}$. If a signal strength of MSB is higher than that of MSA, the repeater may transfer $VH_{B1}$ in a time division multiple access period of the downlink channel for transferring. Besides, if the repeater detects $VH_{B2}$ within a next time division multiple access period of an uplink channel, the repeater may transfer $VH_{B2}$ in a next time division multiple period of the downlink transfer channel (subsequently, the repeater transfers $VH_{B2}$ received last time repeatedly if the repeater does not detect a signal of MSA or a signal of MSB in a next time division multiple access period of the uplink channel, which is described hereinafter and is not described herein in detail). In a case MSA does not detect that the repeater successively transfers VHs of MSA by monitoring, MSA stops subsequent transmission; and in a case MSB detects that the repeater successively transfers two $VH_{B2}$s of MSB, MSB is allowed to access a transfer channel and can continue sending voice.

No matter how the repeater transfers the access request bursts, the terminal determines that the access to the repeater is allowed as long as the terminal monitors that the repeater successively transfers bursts of the terminal for at least two times within the preset period of monitoring time; and the terminal determines that the access to the repeater is rejected if the terminal monitors that the repeater successively transfers bursts of another terminal for at least two times within the preset period of monitoring time. According to the technical solutions of the present disclosure, the terminals do not simply initiate calls to the repeater independently, but gives a period of time to the repeater for processing, and determine whether to send subsequent bursts based on a response of the repeater. Thus, a possible call collision among multiple terminals can be avoided.

In addition, a preferred solution is provided as follows according to the present disclosure, to not increase or minimally increase the extra channel accessing time introduced by the technical solutions according to the present disclosure.

According to the descriptions above, in a complete sending process, the terminal needs to send M voice headers or pre-carrier waves, and M=N+T/t+y, where N is the number of voice headers or pre-carrier waves sent by the terminal before the monitoring, (T/t) is the number of voice headers or pre-carrier waves transferred by the repeater in the monitoring, and Y is the number of voice headers or pre-carrier waves sent by the terminal when it is determined that the terminal is allowed to access the repeater after the monitoring. M may vary with different manufactures and different products, and may have a minimum value of 3; as described above, N may inclusively range from 1 to 3, T is the preset period of monitoring time, and has a minimum value of 60 ms; and t is the time division multiple access period, i.e., a cycle of sending bursts, where t has a minimum value of 0. By fixing M, appropriate N, T and Y may be set, to minimize Y. For example, Y=0. Thus, after it is determined the terminal is allowed to access the repeater, the terminal can directly start sending a voice superframe, a data frame (including a data header and a data block) or a control signaling frame according to a service type.

The solution for saving extra channel accessing time according to the present disclosure is described briefly in conjunction with an example hereinafter.

Figure 7A:
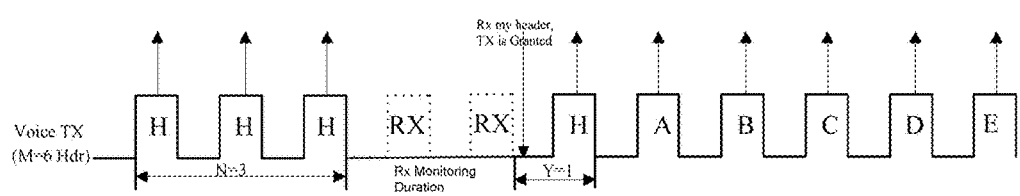
FIG. 7a is a schematic diagram showing a first example of saving channel accessing time according to the present disclosure.

As illustrated in FIG. 7a, in a voice call, the total number of voice headers is 6 (M=6). In a case the number of the access request bursts is 3 (N=3), the preset period of monitoring time is 120 ms (T=120 ms) and the time division multiple access period is 60 ms (t=60 ms), one frame (Y=M−N−T/t=6−3−2=1) of voice headers is included in the subsequent sent burst after the voice call is allowed, that is, the terminal sends continuous voice superframes (a unit of Digital Mobile Radio (DMR) voice superframe includes 6 voice bursts and is 360 ms. The voice bursts included in the voice superframe are denoted by letters A to F respectively, where burst A is a starting frame of the voice superframes and carries a voice synchronization word, and bursts B to F carry embedded signalings) after sending the voice header.

Figure 7B:
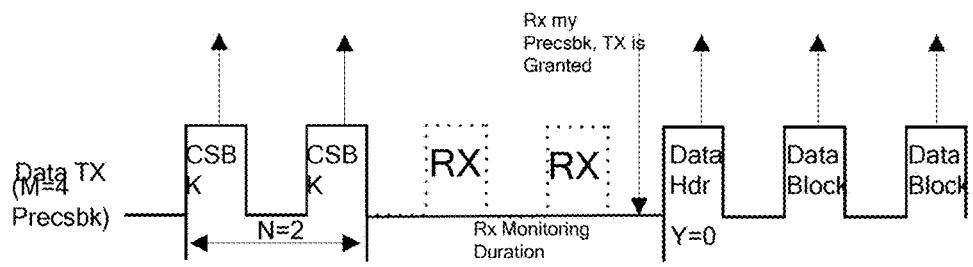
FIG. 7b is a schematic diagram showing a second example of saving channel accessing time according to the present disclosure.

As shown in FIG. 7b, in a data call, the total number of pre-carrier waves is 4 (M=4). If the number of the access request bursts is 2 (N=2), the preset period of monitoring time is 120 ms (T=120 ms) and the time division multiple access period is 60 ms (t=60 ms), in this case, 0 frame (Y=M−N−T/t=4−2−2=0) of pre-carrier wave is included in subsequent bursts sent by the terminal after the voice call is allowed, that is, the terminal can directly send a data header and a subsequent data block.

In addition, it should be noted that in the examples shown in FIGS. 7a and 7b, the subsequent bursts and the access request bursts sent by the terminal to the repeater have a same type, which is a voice header or a pre-carrier wave. In a practical application, the terminal may send bursts of a type different from the type of the access request bursts after the terminal is allowed by the repeater to send the subsequent bursts, for example, the access request bursts are voice headers and the subsequent bursts are pre-carrier waves, which does not affect the effect of avoiding a call collision. Accordingly, the number Y of the subsequent bursts may be set as a designated value based on practical situations.

The Second Embodiment

Figure 8:
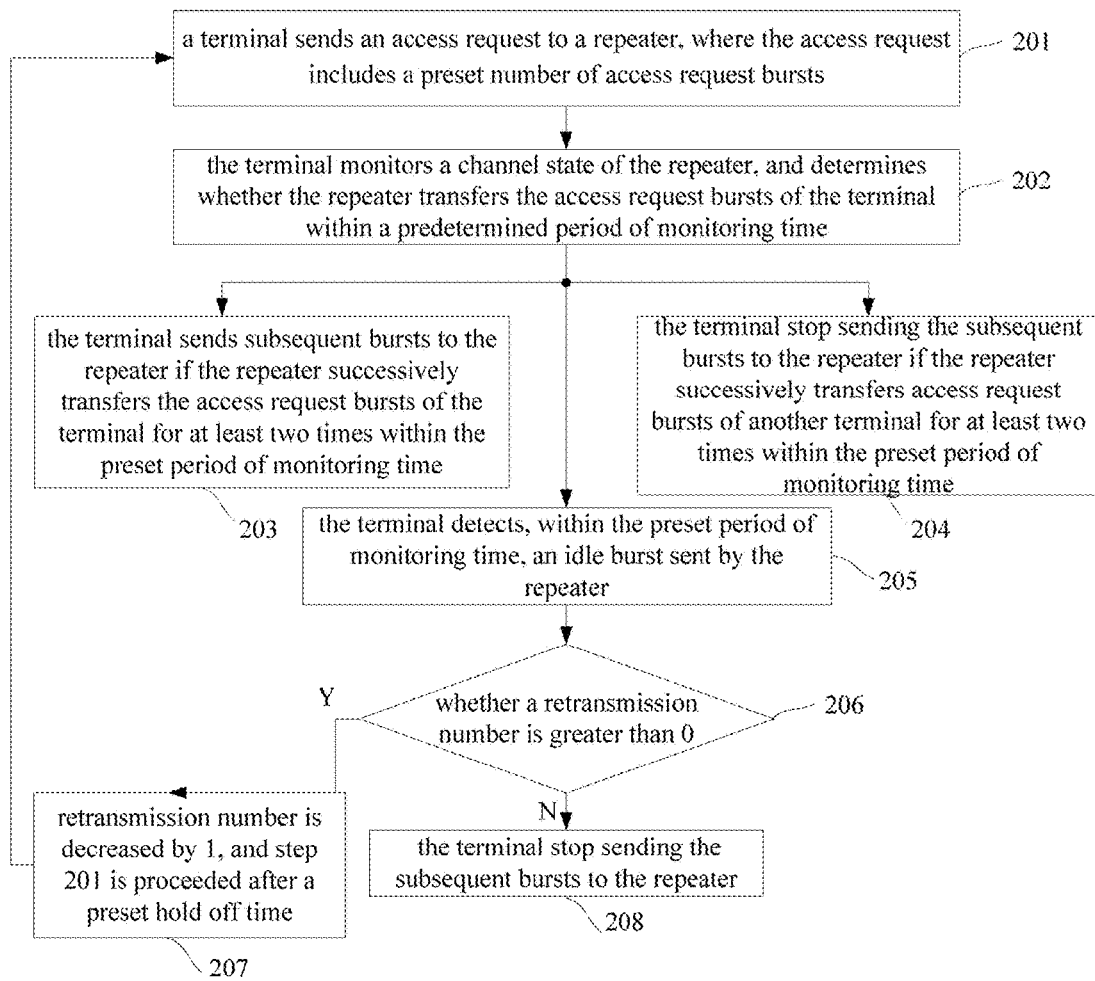
FIG. 8 is a flowchart of a second embodiment of a call collision processing method of a terminal according to the disclosure.

FIG. 8 is a flowchart of a second embodiment of a call collision processing method of a terminal according to the disclosure. The call collision processing method may include steps 201 to 208.

In step 201, a terminal sends an access request to a repeater, where the access request includes a preset number of access request bursts.

In step 202, the terminal monitors a channel state of the repeater, and determines whether the repeater transfers the access request bursts of the terminal within a predetermined period of monitoring time.

In step 203, the terminal sends subsequent bursts to the repeater if the repeater successively transfers the access request bursts of the terminal for at least two times within the preset period of monitoring time.

In step 204, the terminal stop sending the subsequent bursts to the repeater if the repeater successively transfers access request bursts of another terminal for at least two times within the preset period of monitoring time.

Steps 201 to 204 are the same as steps 101 to 104, which are not described herein.

In step 205, the terminal detects, within the preset period of monitoring time, an idle burst sent by the repeater.

In step 206, the terminal determines whether a retransmission number is greater than 0. In a case the retransmission number is greater than 0, step 207 is proceeded, in which the retransmission number is decreased by 1, and step 201 is proceeded after a preset hold off time. In a case that the retransmission number is not greater than 0, step 208 is proceeded, in which the terminal stop sending the subsequent bursts to the repeater.

Generally, after being activated, the repeater may send an idle burst through a downlink channel, to indicate that a current state of the repeater is an idle state and the terminal is allowed to access the repeater. In a case the terminal can still detect an idle burst sent by the repeater after sending the access request burst to the repeater, it is indicated at least two terminals initiate calls to the repeater and a call collision occurs between the at least two terminals, which causes that the repeater can not detect an uplink burst. In this case, the terminal may directly stop sending the subsequent bursts to the repeater, or start a random avoidance mechanism and retry to access the repeater after the avoidance, to improve a flexibility of processing the call collision.

The retransmission time is set for each terminal based on a communication requirement. After detecting the idle burst, the terminal determines whether to start the avoidance mechanism or not. In a case the retransmission number is greater than 0, the avoidance mechanism is started; and in a case the retransmission number is 0, the avoidance mechanism is not started.

The terminal needs to perform the two following operations to start the avoidance mechanism:

(1) decreasing the retransmission number by one, which facilitates accurately determining when to quit the avoidance mechanism; and (2) starting a random avoidance timer, to correctly determine an end time of a single avoidance process.

After the random avoidance timer indicates that the preset hold off time is exceeded, the terminal may end this avoidance process, proceed sending an access request to the repeater and then monitor the channel state of the repeater. In this case, if another idle burst is detected, the terminal may perform the avoidance process again in a case that the retransmission number is greater than 0. In a case the retransmission number is decreased to 0, the terminal may determine that the access to the terminal is rejected, and the terminal may stop sending the subsequent bursts to the repeater.

The preset hold off time of each terminal is set based on a practical communication requirement. Thus, the terminal can perform a random avoidance based on a respective preset hold off time in case of a call collision, so that a possibility of the call collision between at least two terminals is minimized. In a case that the call collision occurs between two terminals having a same preset hold off time and a same retransmission number, the two terminals may stop sending subsequent bursts to the repeater after accomplishing a certain number of avoidance (which depends on the retransmission number). Compared with the solution of stopping sending bursts after detecting the idle burst, the solution according to the embodiment is more flexible, and is more applicable to a practical communication.

It should be note that the retransmission number multiplies the preset hold off time is a duration of the whole avoidance mechanism. As the duration may affect the channel accessing time, the channel accessing time should be taken into account when setting the retransmission number and the preset hold off time, to avoid the call collision without affecting the user experience.

The Third Embodiment

Figure 9:
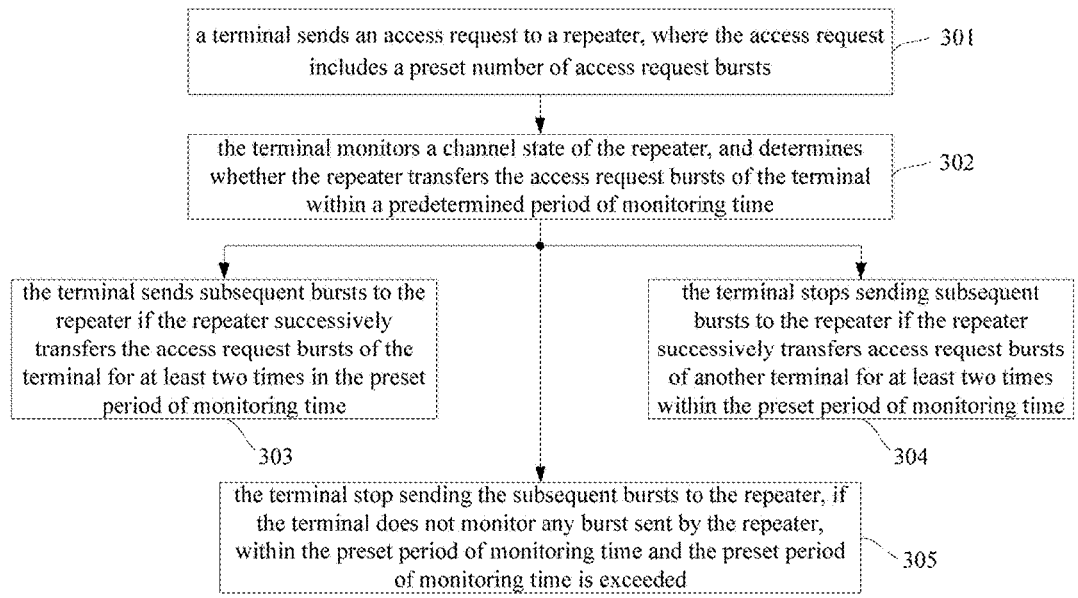
FIG. 9 is a flowchart of a third embodiment of a call collision processing method of a terminal according to the disclosure.

FIG. 9 is a flowchart of a third embodiment of a call collision processing method of a terminal according to the disclosure. The method may include steps 301 to 305.

In step 301, a terminal sends an access request to a repeater, where the access request includes a preset number of access request bursts.

In step 302, the terminal monitors a channel state of the repeater, and determines whether the repeater transfers the access request bursts of the terminal within a predetermined period of monitoring time.

In step 303, the terminal sends subsequent bursts to the repeater if the repeater successively transfers the access request bursts of the terminal for at least two times in the preset period of monitoring time.

In step 304, the terminal stops sending subsequent bursts to the repeater if the repeater successively transfers access request bursts of another terminal for at least two times within the preset period of monitoring time.

Steps 301 to 304 are the same as steps 101 to 104, which are not described herein in detail.

In step 305, the terminal stop sending the subsequent bursts to the repeater, if the terminal does not monitor any burst sent by the repeater within the preset period of monitoring time and the preset period of monitoring time is exceeded.

If the terminal neither detects that the repeater transfers the access request burst nor detects that the repeater sends an idle burst within the preset period monitoring time, that is, the terminal does not detect any operation of the repeater within the preset period monitoring time, the terminal may resend an access request to the repeater to try accessing the repeater. Alternatively it can be directly determined that the terminal is rejected to access the repeater and is stopped to send subsequent bursts to the repeater. Preferably, in order to reduce time spent on processing the call collision and to avoid introducing too much extra channel accessing time, the terminal stops trying to access the repeater after it is determined that the preset period of monitoring time is exceeded.

It should be noted that a case that a receiving frequency point of the repeater is subject to a co-channel interference, or the terminal moves out of the coverage of the repeater may cause that the terminal can not detects a signal of the repeater within the preset period of monitoring time.

The Fourth Embodiment

Figure 10:
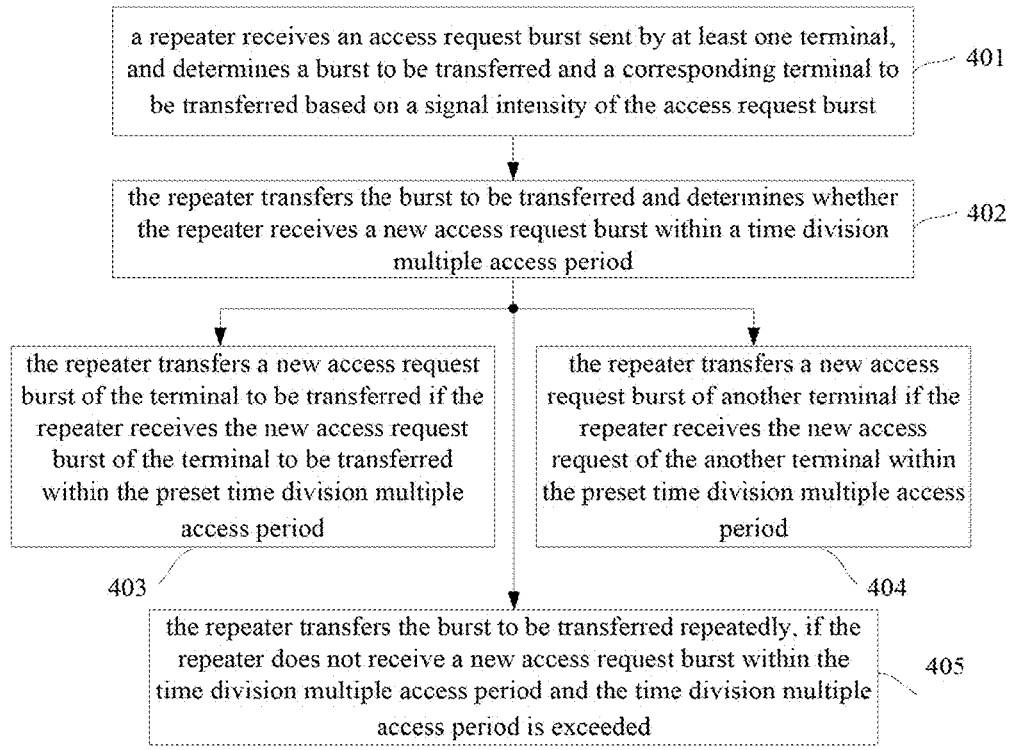
FIG. 10 is a flowchart of a first embodiment of a call collision processing method of a repeater according to the disclosure.

FIG. 10 illustrates a flowchart of a first embodiment of a call collision processing method of a repeater according to the disclosure. The method includes steps 401 to 405.

In step 401, a repeater receives an access request burst sent by at least one terminal, and determines a burst to be transferred and a corresponding terminal to be transferred based on a signal strength of the access request burst.

Corresponding to the first to third embodiments, in the embodiment, the process of processing a call collision by the repeater is described from a perspective of the repeater. After being activated, the repeater starts sending an idle burst through a downlink channel and detects whether there is a terminal requesting for an access. If receiving an access request burst sent by the terminal, the repeater may make a response to the request, which may include two following cases.

In the first case, only one terminal requests for an access to the repeater currently. If a signal strength of the access request burst of the terminal meet a requirement of the repeater, the repeater transfers the access request burst of the terminal in response to the terminal. Generally, the receipt of the access request burst by the terminal indicates that the signal strength of the access request burst meet the requirement of the repeater.

In the second case, at least two terminals requests for accesses to the repeater currently. In this case, the repeater selects a burst with a highest signal strength as the burst to be transferred and determines a terminal which sends the burst with the highest signal strength as the terminal to be transferred. In addition, a signal covering may be performed between the access request bursts of the at least two terminals based on signal intensities, that is, the burst with the highest signal strength covers the other bursts with lower signal intensities, and only the burst with the highest signal strength is received by the repeater, and is used as the burst to be transferred.

In this step, the repeater may select a burst with a high signal strength or a high quality as the burst to be transferred based on determination ways such as field intensities or synchronization. The way for selecting the burst to be transferred is not limited in the disclosure, as long as the burst to be transferred with the highest signal strength can be determined from the access request bursts.

In step 402, the repeater transfers the burst to be transferred and determines whether the repeater receives a new access request burst within a time division multiple access period.

In step 403, the repeater transfers a new access request burst of the terminal to be transferred if the repeater receives the new access request burst of the terminal to be transferred within the preset time division multiple access period.

After the determination in step 402, if the repeater receives the new access request burst within the time division multiple access period and the new access request burst is sent by the terminal to be transferred, the repeater transfers the new access request burst of the terminal to be transferred. If the terminal to be transferred detects that the repeater successively transfers access request bursts of the terminal to be transferred for two times within the preset period of monitoring time after sending the access request bursts, it is indicated that the terminal to be transferred is allowed to access the repeater, thus the terminal to be transferred can send subsequent bursts to the repeater.

The expression that the repeater receives the new access request burst of the terminal to be transferred within the time division multiple access period may be understood as that only the terminal to be transferred sends the new access request burst to the repeater currently and the signal strength of the new access request burst meet the requirement of the repeater; or at least two terminals (including the terminal to be transferred) sends new access requests to the repeater currently and the signal strength of the new access request sent by the terminal is the highest.

Referring to the example illustrated in FIG. 5, MSA and MSB initiate access request bursts at a same time division multiple access period point. Since a signal strength of MSA is higher than that of MSB, the repeater successively transfers two bursts ($VH_{A1}$ and $VH_{A2}$) of MSA. No terminal initiates an access request burst at a next time division multiple access period point, and the repeater transfers $VH_{A2}$ repeatedly, to allow MSA to access the repeater. It should be noted that since $VH_{A1}$ is missed when MSA is monitored, MSA is allowed to access the repeater only when two following $VH_{A2}$ are received.

In step 404, the repeater transfers a new access request burst of another terminal if the repeater receives the new access request of the another terminal within the preset time division multiple access period.

After the determination in step 402, if the repeater receives the new access request burst within the time division multiple access period and the new access request burst is sent by the another terminal (which is a terminal other than the terminal to be transferred), the repeater may transfer the new access request burst sent by the another terminal. In this case, the repeater does not successively transfer access request bursts of one terminal twice within the preset period of monitoring time of the terminal, thus the terminal does not know whether the access to the repeater is allowed. In this case, the terminal which sends the new access request is used as the terminal to be transferred, whether the next time division multiple access period point is reached is determined, to determine whether a new access request burst is received within the time division multiple access period, which may be understood as a loop execution of the technical solutions according to the present disclosure. The objective of such solution is to allow the terminal to detect that the repeater successively transfers bursts of one terminal twice within the preset period of monitoring time, so as to determine subsequent operations (if the access is allowed, the terminal sends subsequent bursts, and if the access is not allowed, the terminal stop sending subsequent bursts) for the terminal which requests accessing to the repeater.

The expression that the repeater receives the new access request burst of the another terminal within the time division multiple access period may be understood as that the repeater does not receive a new access request burst of the terminal to be transferred within a next time division multiple access period due to an interruption in a sending process of the terminal to be transferred, while another terminal sends a new access request burst to the repeater within the next time division multiple access period and a signal strength of the new access request burst sent by the another terminal meets the requirement of the repeater; or the terminal to be transferred and another terminal send new access request bursts to the repeater currently, and the signal strength of the new access request burst sent by the terminal to be transferred is lower than that of the new access request burst sent by the another terminal.

Referring to the example illustrated in FIG. 6, the repeater determines $VH_{A1}$ as the burst to be transferred and determines MSA as the terminal to be transferred at the beginning. After transferring $VH_{A1}$, the repeater receives $VH_{B1}$ sent by MSB within a time division multiple access period. Although MSA sends $VH_{A2}$ at the same time division multiple access period point, the repeater determines $VH_{B1}$ as the burst to be transferred, determines MSB as the terminal to be transferred since a signal strength of $VH_{A2}$ is lower than that of $VH_{B1}$, and transfers $VH_{B1}$ through a downlink channel. After the process above, the repeater may determine whether the next time division multiple access period point is reached, and detects a burst received within this time division multiple access period. As shown in FIG. 6, $VH_{B2}$ is continually transferred if the repeater receives $VH_{B2}$ sent by MSB, so that the repeater successively transfer bursts (i.e., $VH_{B1}$ and $VH_{B2}$) of MSB twice. At a next time division multiple access period point, no access request burst is detected by the repeater and $VH_{B2}$ is repeatedly transferred by the repeater. Since when is monitored, $VH_{B1}$ is missed, MSB is allowed to access the repeater only if two subsequent $VH_{B2}$ are received.

In step 405, the repeater transfers the burst to be transferred repeatedly, if the repeater does not receive a new access request burst within the time division multiple access period and the time division multiple access period is exceeded.

After the determination in step 402, it may be determined that the transmission of bursts by the terminal is interrupted if the repeater receives does not receive a new access request burst (which may be a new burst sent by the terminal to be transferred, or a new burst sent by another terminal), and in this case, the repeater may transfer the burst to be transferred repeatedly, to successively transfer bursts of the terminal for at least two times. After the transmission of bursts by the terminal to be transferred is recovered, it may be directly determined that the terminal to be transferred is allowed to access the repeater, which can save the channel accessing time in the technical solutions of the present disclosure.

In step 404, after MSB is determined to be the terminal to be transferred and $VH_{B1}$ is determined to be the burst to be transferred, the repeater may transfer $VH_{B1}$ repeatedly if the repeater receive does not receive a new access request burst within the next time division multiple access period. That is, the repeater transfers a burst received last time repeatedly if the repeater does not receive a new access request burst during the time division multiple access period.

It should be noted that the time division multiple access period in the embodiment is the time division multiple access period mentioned in the descriptions of FIG. 6 and is an appropriate period for receipt. Considering that a short interruption of the terminal may occur in a practical communication, the above technical solution to the short interruption is provided according to the present disclosure, so that the technical solutions according to the present disclosure may more confirm to a practical application.

In view of above, the repeater can transfers the access request burst according to the three cases in steps 403, 404 and 405, to successively transfer access request bursts of a terminal for at least two times, so that whether the terminal is allowed or rejected to access the repeater is determined. According to the descriptions above, there are two cases that the terminal is allowed to access the repeater:

(1) the repeater successively transfers different access request bursts of a same terminal, such as $VH_A$ and $VH_{A2}$ in step 403 or $VH_{B1}$ and $VH_{B2}$ in step 404; and (2) the repeater transfers a same access request burst of the terminal repeatedly, such as $VH_{B2}$ in FIG. 6, which is repeatedly transferred.

The Fifth Embodiment

Figure 12:
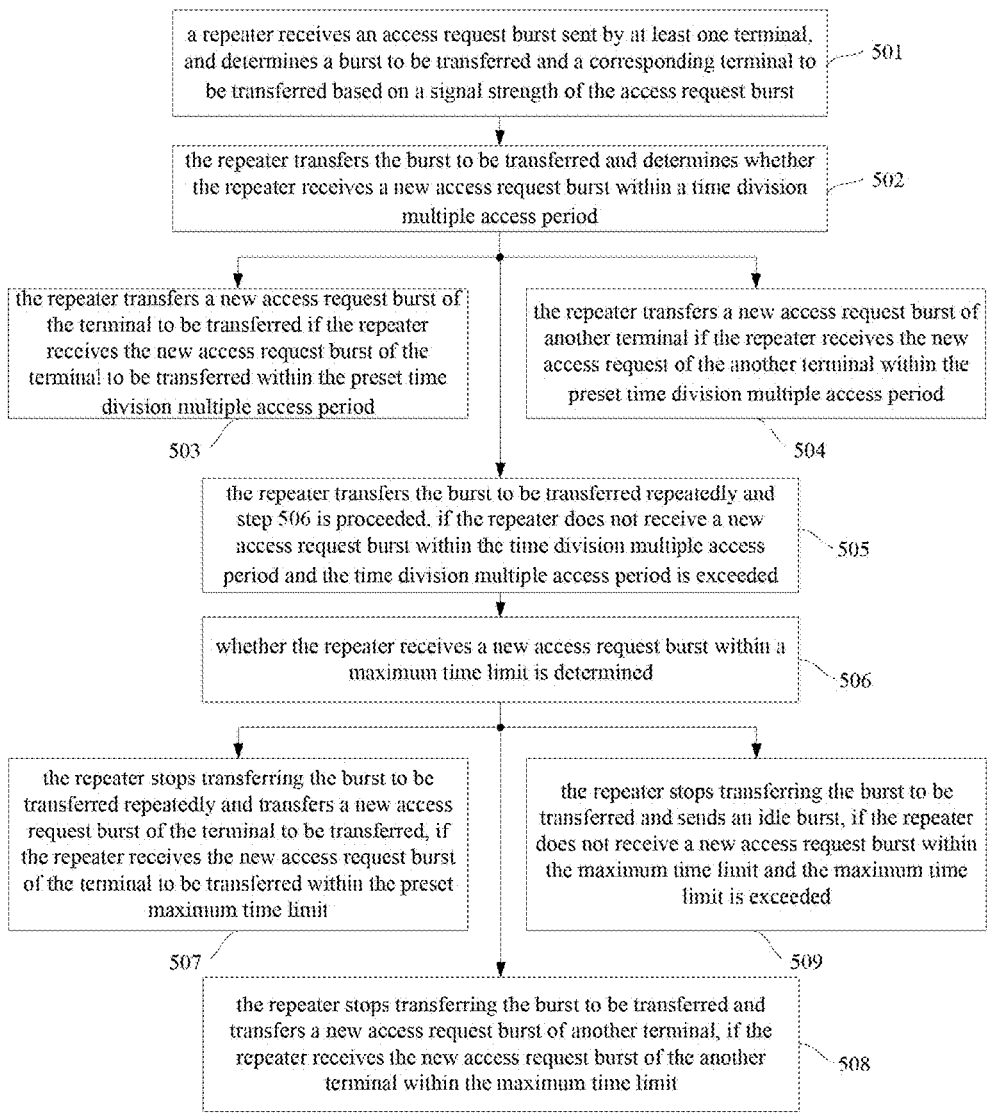
FIG. 12 is a flowchart of a second embodiment of a call collision processing method of a repeater according to the disclosure.

FIG. 12 illustrates a flowchart of a second embodiment of a call collision processing method of a repeater according to the disclosure. The method includes steps 501 to 509.

In step 501, a repeater receives a access request burst sent by at least one terminal, and determines a burst to be transferred and a corresponding terminal to be transferred based on a signal strength of the access request burst.

In step 502, the repeater transfers the burst to be transferred and determines whether the repeater receives a new access request burst within a time division multiple access period.

In step 503, the repeater transfers a new access request burst of the terminal to be transferred if the repeater receives the new access request burst of the terminal to be transferred within the preset time division multiple access period.

In step 504, the repeater transfers a new access request burst of another terminal if the repeater receives the new access request of the another terminal within the preset time division multiple access period.

In step 505, the repeater transfers the burst to be transferred repeatedly and step 506 is proceeded, if the repeater does not receive a new access request burst within the time division multiple access period and the time division multiple access period is exceeded.

In step 506, whether the repeater receives a new access request burst within a maximum time limit is determined.

In the fourth embodiment illustrated in FIG. 10, the repeater transfers a burst received last time repeatedly, if the repeater does not receive a new access request burst within a next time division multiple access period and the next time division multiple access period is exceeded, to deal with a short interruption to the terminal. If the transmission of the terminal can be recovered quickly, the repeater may receive a new access request burst in a short time, thus the repetitive transfers may be ended, the terminal is allowed to access the repeater after the new access request is transferred and the subsequent bursts sent by the terminal is received. If the transmission of the terminal can not be recovered quickly, and the repeater keeps transferring the burst received last repeatedly, which may increase the channel accessing time so that a user can not get a response (the response may be an operation is allowed, or an operation is denied) after performing an operation on the terminal, thus affecting the user experience.

In order not to cause excessive channel accessing time, the maximum time limit may be set in the embodiment to end the repetitive transfers in a case that the terminal can be recovered quickly. Thus, besides the technical solution to the short interruption of the terminal, a technical solution to a long interruption of the terminal is also provided according to the present disclosure.

If the repeater transfers $VH_{A1}$ of MSA currently, there are three cases when a next time division multiple access period starts:

(1) if $VH_{A2}$ sent by MSA is monitored within a time division multiple access period $T_1$, the repeater transfers $VH_{A2}$ and a burst sent by the terminal within a next time division multiple access period is monitored, and the short interruption to the terminal is dealt with based on $T_1$;

(2) if $VH_{B1}$ sent by MSB is monitored within a time division multiple access period $T_1$, the repeater transfers $VH_{B1}$ and a burst sent by the terminal within a next time division multiple access period is monitored, and the short interruption to the terminal is dealt with based on $T_1$; and (3) if the repeater does not detect a burst within the time division multiple access period $T_1$, the repeater starts a maximum time limit timer (used to time the maximum time limit) after T1 is exceeded and determines whether a burst sent by the terminal is monitored by the repeater within a maximum time limit $T_2$ ($T_1 < T_2$), which may include three cases described in steps 507 to 509.

In step 507, the repeater stops transferring the burst to be transferred repeatedly and transfers a new access request burst of the terminal to be transferred, if the repeater receives the new access request burst of the terminal to be transferred within the preset maximum time limit.

When monitoring within $T_2$, the repeater transfers the burst received last time repeatedly according to time division multiple access periods, and the repeater transfers $VH_{A1}$ repeatedly in the embodiment. It should be noted that the repeater may determine whether a next time division multiple access period point is reached while starting the maximum time limit timer, to control a cycle period of the repetitive transfer. If $T_1$ is exceeded, the repeater assembles a frame for repetitive transfer to control the cycle period of the repetitive transfer.

After the maximum time limit time is started, the repeater can stop transferring $VH_{A1}$ repeatedly and transfer $VH_{A2}$, if the repeater receives the new access request burst $VH_{A2}$ before $T_2$ is exceeded and the new access request burst $VH_{A2}$ is sent by MSA. After transferring $VH_{A2}$, the repeater may determine whether a next time division multiple access period point is reached and whether a subsequent new burst is received within $T_1$.

In step 508, the repeater stops transferring the burst to be transferred and transfers a new access request burst of another terminal, if the repeater receives the new access request burst of the another terminal within the maximum time limit.

After the maximum time limit timer is started, the repeater may stop transferring $VH_{A1}$ repeatedly and transfer $VH_{B1}$, if the repeater receives the new access request burst $VH_{B1}$ before $T_2$ is exceeded and the new access request burst $VH_{B1}$ is sent by MSB. After transferring $VH_{B1}$, the repeater may determine whether the next time division multiple access period point is reached and whether the subsequent new burst is received within $T_1$.

It should be noted that the repeater keeps transferring $VH_{A1}$ received last time repeatedly based on the time division multiple access period before receiving $VH_{B1}$.

In step 509, the repeater stops transferring the burst to be transferred and sends an idle burst, if the repeater does not receive a new access request burst within the maximum time limit and the maximum time limit is exceeded.

After the maximum time limit timer is started, the repeater may end repetitive transfers the and broadcast the idle burst to a downlink channel if the repeater does not receive a burst within $T_2$. Thus, the terminal in the system may send the access request to the repeater on a usage requirement of the terminal after detecting the idle burst sent by the repeater.

It should be noted that the repeater keeps transferring $VH_{A1}$ received last time repeatedly based on the time division multiple access period within the maximum time limit $T_2$.

The Sixth Embodiment

Figure 13:
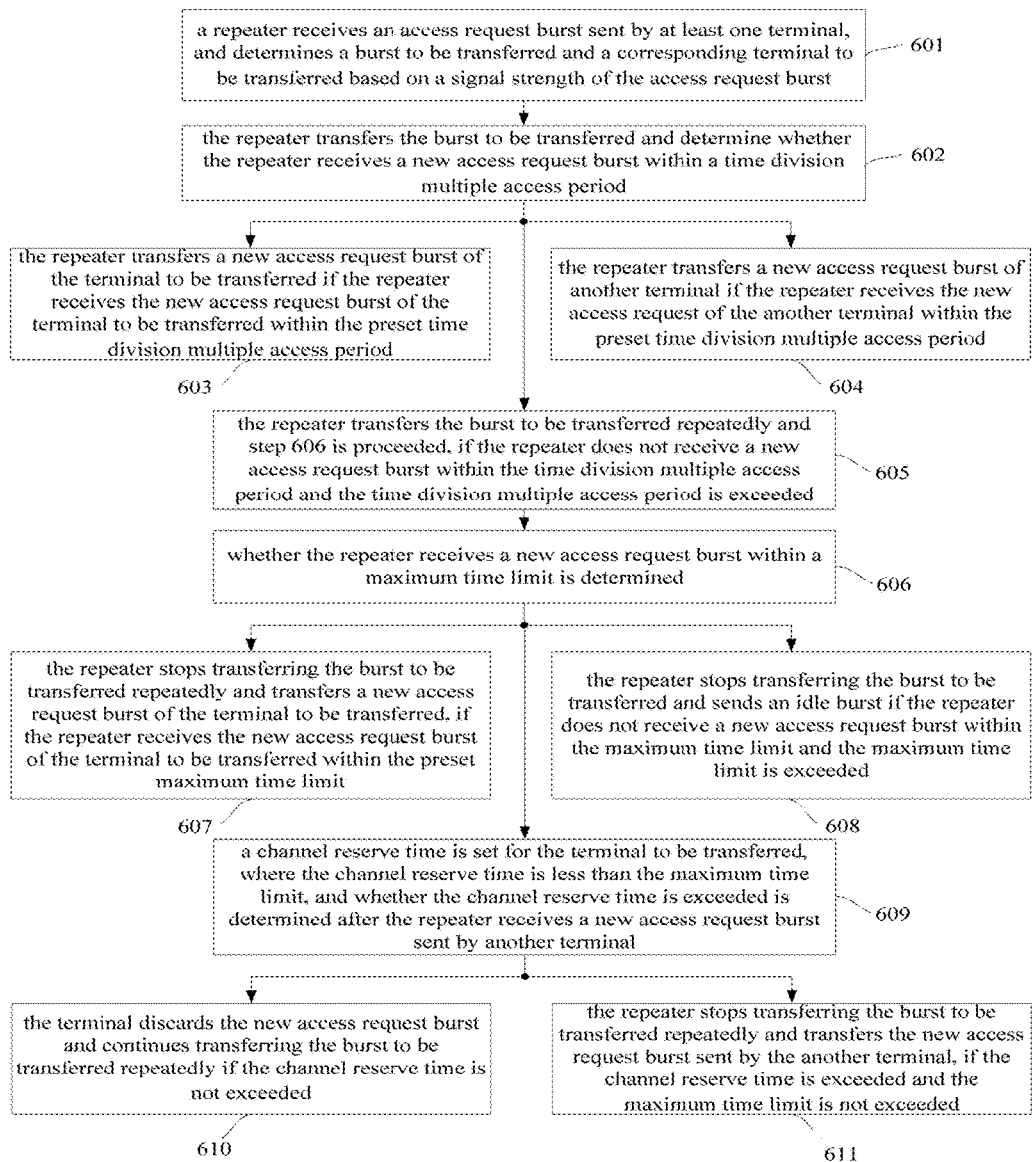
FIG. 13 is a flowchart of a third embodiment of a call collision processing method of a repeater according to the disclosure.

For the case described in step 508 in the fifth embodiment, a preferred technical solution is further provided according to the present disclosure. FIG. 13 illustrates a flowchart of a third embodiment of a call collision processing method of a repeater according to the disclosure. The method may include steps 601 to 611.

In step 601, a repeater receives an access request burst sent by at least one terminal, and determines a burst to be transferred and a corresponding terminal to be transferred based on a signal strength of the access request burst.

In step 602, the repeater transfers the burst to be transferred and determine whether the repeater receives a new access request burst within a time division multiple access period.

In step 603, the repeater transfers a new access request burst of the terminal to be transferred if the repeater receives the new access request burst of the terminal to be transferred within the preset time division multiple access period.

In step 604, the repeater transfers a new access request burst of another terminal if the repeater receives the new access request of the another terminal within the preset time division multiple access period.

In step 605, the repeater transfers the burst to be transferred repeatedly and step 606 is proceeded, if the repeater does not receive a new access request burst within the time division multiple access period and the time division multiple access period is exceeded.

In step 606, whether the repeater receives a new access request burst within a maximum time limit is determined.

In step 607, the repeater stops transferring the burst to be transferred repeatedly and transfers a new access request burst of the terminal to be transferred if the repeater receives the new access request burst of the terminal to be transferred within the preset maximum time limit.

In step 608, the repeater stops transferring the burst to be transferred and sends an idle burst if the repeater does not receive a new access request burst within the maximum time limit and the maximum time limit is exceeded.

Steps 601 to 607 are the same as steps 501 to 507, and step 608 is the same as step 509, which are not described in detail herein.

In step 609, a channel reserve time is set for the terminal to be transferred, where the channel reserve time is less than the maximum time limit, and whether the channel reserve time is exceeded is determined after the repeater receives a new access request burst sent by another terminal.

Figure 11:
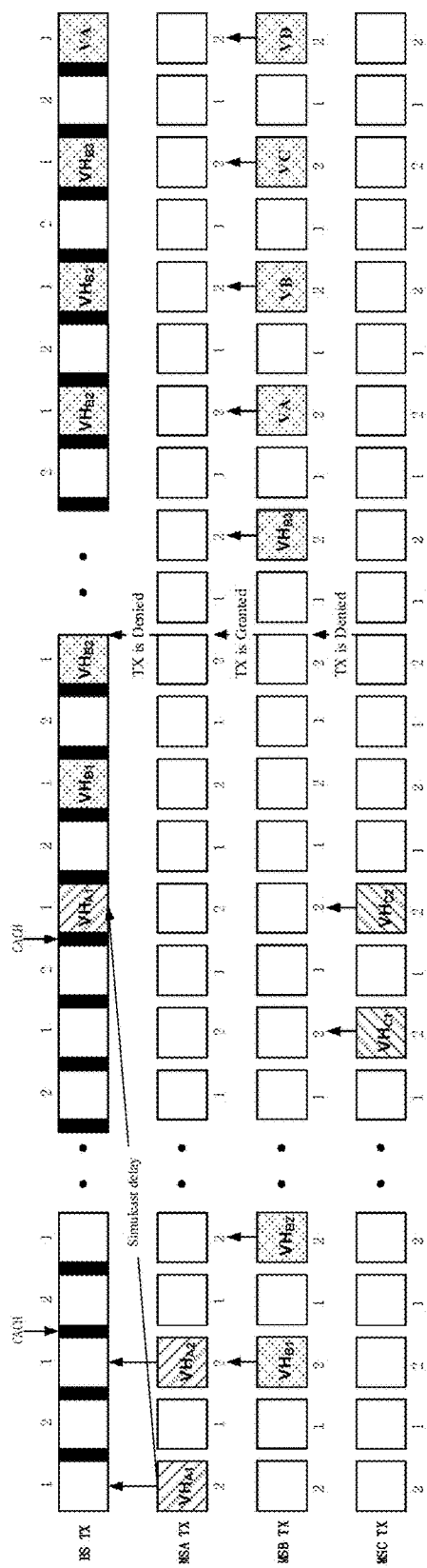
FIG. 11 is sequence diagram in a third implementation of a call collision processing method according to the present disclosure.

In the embodiment illustrated in FIG. 11, whether a channel reserve time $T_3$ ($T_3<T_2$) is exceeded is determined if the repeater receives the new access request burst sent by another terminal MSC while transferring $VH_{B2}$ repeatedly within $T_2$. If the channel reserve time $T_3$ is not exceeded, the repeater discards bursts $VH_{C1}$ and $VH_{C2}$ sent by MSC and continues to transfer $VH_{B2}$ repeatedly, to reserve a channel for MSB. If the new access request burst received by the repeater within $T_2$ is a subsequent burst sent by the terminal to be transferred, the repeater stops transferring $VH_{B2}$ repeatedly and starts transferring the subsequent bursts of MSB.

For an application scenario such as a simulcast system with a long delay, it is possible that the terminal to be transferred sends a new access request burst to the repeater, and before receiving the new access request burst sent by the terminal to be transferred, the repeater receives an access request burst sent by another terminal which is staggered with the new access request burst sent by the terminal to be transferred due to a long transfer delay of the terminal to be transferred. A reasonability of the technical solutions according to the present disclosure may be affected if the repeater transfers the access request burst sent by the another terminal directly in this case. Thus, in the embodiment, the repeater sets the channel reserve time for a terminal, where the repeater successively transfers bursts (including successively transferring different bursts, or successively transferring a same burst) of the terminal for at least (N+1) times (N is the preset number of the access request bursts sent by the terminal).

In step 610, the terminal discards the new access request burst and continues transferring the burst to be transferred repeatedly if the channel reserve time is not exceeded.

In step 611, the repeater stops transferring the burst to be transferred repeatedly and transfers the new access request burst sent by the another terminal, if the channel reserve time is exceeded and the maximum time limit is not exceeded.

As similar to the fifth embodiment, there are three cases in the embodiment illustrated in FIG. 11 after the repeater starts the maximum time limit timer, which are described as follows.

The first case is in step 607 in the embodiment. After the maximum time limit timer is started, the repeater keeps transferring $VH_{B2}$ repeatedly before receiving the subsequent burst sent by MSB. And the repeater stops transferring $VH_{B2}$ repeatedly after receiving $VH_{B3}$, and transfers $VH_{B3}$ instead.

The second case is in step 608 in the embodiment. After the maximum time limit timer is started, the repeater keeps transferring $VH_{B2}$ repeatedly, and if the repeater does not receive a new access request burst within $T_2$, the repeater sends an idle burst after $T_2$ is exceeded.

In the third case, a reserve time timer is started when the maximum time limit timer is started. If the repeater receives an access request burst sent by another terminal, for example, $VH_{C1}$ sent by MSC, the repeater discards $VH_{C1}$ and continues to transfer $VH_{B2}$ repeatedly, as is described in step 610 in the embodiment. If $T_3$ is exceeded (and $T_2$ is not exceeded), the repeater stops reserving a channel for MSB, and can transfer bursts sent by another terminal when the repeater receives an access request burst sent by the another terminal. For example, in a case that the repeater receives $VH_{B3}$ and subsequent voice superframe bursts (VA~VF), the repeater stops transferring $VH_{B2}$ repeatedly and transfers $VH_{B3}$ and the subsequent voice superframe bursts (VA~VF) instead, as is described in step 611 in the embodiment.

It should be noted that in the embodiment illustrated in FIG. 11, the maximum time limit includes the simulcast delay.

The Seventh Embodiment

Figure 14:
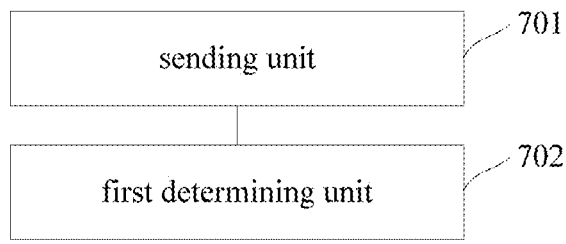
FIG. 14 is a schematic diagram of a first embodiment of a terminal according to the disclosure.

Corresponding to the methods according to the first embodiment, the second embodiment and the third embodiment, a terminal (the terminal may be a device which can communicate with a base station, such as a cell phone or an interphone) is provided according to the present disclosure. FIG. 14 is a schematic diagram of a first embodiment of a terminal according to the disclosure. The terminal includes:

a sending unit 701, configured to send an access request to a repeater, where the access request includes a preset number of access request bursts; and a first determining unit 702, configured to monitor a channel state of the repeater and determines whether the repeater transfers the access request burst of the terminal within a preset period of monitoring time, where the sending unit sends subsequent bursts to the repeater if the repeater successively transfers the access request burst of the terminal for at least two times within the preset period of monitoring time, and the sending unit stops sending the subsequent bursts to the repeater if the repeater successively transfers access request bursts of another terminal for at least two times within the preset period of monitoring time.

It should be noted that in order to not increase or minimally increase the extra channel accessing time introduced by the technical solutions according to the present disclosure, the subsequent bursts sent by the sending unit are required to include minimum voice headers or pre-carrier waves or even not include a voice header or a pre-carrier waves. The number Y of voice headers or pre-carrier waves included in the subsequent bursts is Y=M−N−(T/t), where Y≥0, M is the number of access request bursts required in one complete sending process, N is the preset number of the access request bursts included in the access request, T is the preset period of monitoring time and t is the time division multiple access period.

In addition, in a terminal according to a preferred embodiment of the disclosure, the first determining unit is further configured to notify the sending unit to stop sending the subsequent bursts to the repeater, if no burst sent by the repeater is detected within the preset period of monitoring time and the preset period of monitoring time is exceeded.

The Eighth Embodiment

Figure 15:
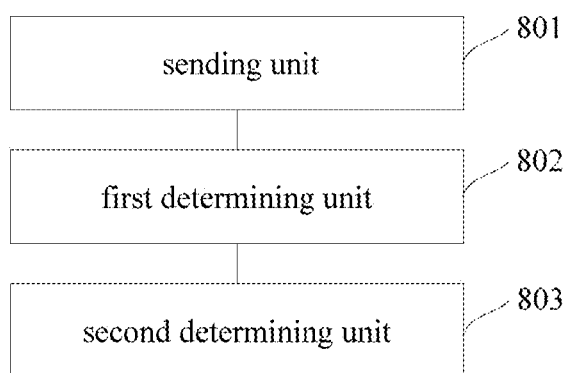
FIG. 15 is a schematic diagram of a second embodiment of a terminal according to the disclosure.

FIG. 15 is a schematic diagram of a second embodiment of a terminal according to the disclosure. The terminal may include:

a sending unit 801, configured to send an access request to a repeater, where the access request includes a preset number of access request bursts; and a first determining unit 802, configured to monitor a channel state of the repeater and determine whether the repeater transfers the access request burst of the terminal within the preset period of monitoring time, where the sending unit sends subsequent bursts to the repeater if the repeater successively transfers the access request bursts of the terminal for at least two times within the preset period of monitoring time, and the sending unit stops sending the subsequent bursts to the repeater if the repeater successively transfers access request bursts of another terminal for at least two times within the preset period of monitoring time; and a second determining unit 803, configured to determine whether a retransmission number is greater than 0, in a case that an idle burst sent by the repeater is detected within the preset period of monitoring time; decrease the retransmission number by one and notify the sending unit to send an access request to the repeater after a hold off time if the retransmission number is greater than 0; and notify the sending unit to stop sending the subsequent bursts to the repeater if the retransmission number is not greater than 0.

The Ninth Embodiment

Figure 16:
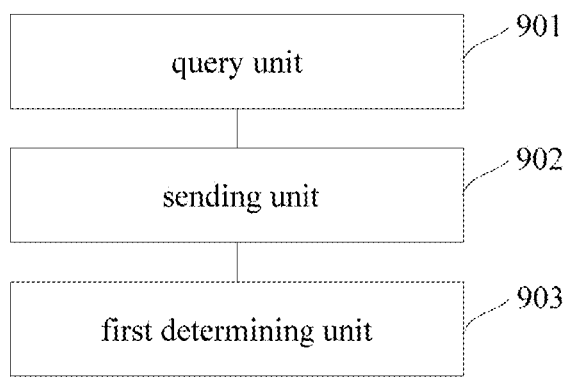
FIG. 16 is a schematic diagram of a third embodiment of a terminal according to the disclosure.

FIG. 16 is a schematic diagram of a third embodiment of a terminal according to the disclosure. The terminal may include:

a query unit 901, configured to query for a channel state of a repeater, and notify a sending unit to send an access request to the repeater in a case that the channel state is an idle state or a call hang time state;

a sending unit 902, configured to send the access request to the repeater, where the access request includes a preset number of access request bursts; and a first determining unit 903, configured to monitor a channel state of the repeater and determine whether the repeater successively transfers the access request bursts of the terminal within a preset period of monitoring time, where the sending unit sends subsequent bursts to the repeater if the repeater successively transfers the access request bursts of the terminal for at least two times within the preset period of monitoring time, and the sending unit stops sending the subsequent bursts to the repeater if the repeater successively transfers access request bursts of another terminal for at least two times within the preset period of monitoring time.

The Tenth Embodiment

Figure 17:
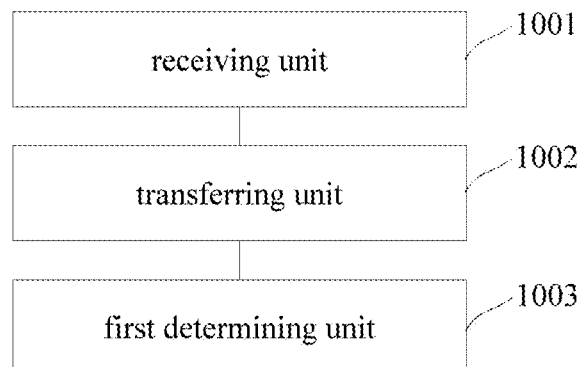
FIG. 17 is a schematic diagram of a first embodiment of a repeater according to the disclosure.

Corresponding to the methods according to the fourth embodiment, the fifth embodiment and the sixth embodiment, a repeater is provided according to the present disclosure. FIG. 17 is a schematic diagram of a first embodiment of a repeater according to the disclosure. The repeater may include:

a receiving unit 1001, configured to receive an access request burst sent by at least one terminal and determine a burst to be transferred and a corresponding terminal to be transferred based on a signal strength of the access request burst;

a transferring unit 1002, configured to transfer the burst to be transferred determined by the receiving unit; and a first determining unit 1003, configured to determine whether the receiving unit receives a new access request burst within a time division multiple access period, notify the transferring unit to transfer a new access request burst of the terminal to be transferred if the receiving unit receives the new access request burst of the terminal to be transferred within the time division multiple access period, notify the transferring unit to transfer a new access request burst of another terminal if the receiving unit receives the new access request burst of the another terminal within the time division multiple access period, and notify the transferring unit to transfer the burst to be transferred repeatedly, if the receiving unit does not receive a new access request burst within the time division multiple access period and the time division multiple access period is exceeded.

The Eleventh Embodiment

Figure 18:
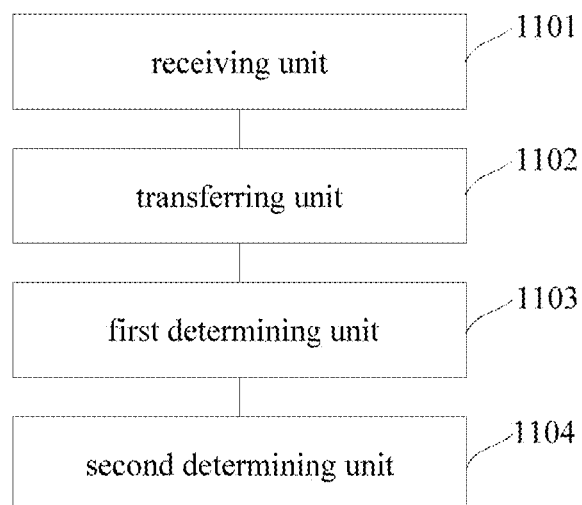
FIG. 18 is a schematic diagram of a second embodiment of a repeater according to the disclosure.

FIG. 18 is a schematic diagram of a second embodiment of a repeater according to the disclosure. The repeater may include:

a receiving unit 1101, configured to receive an access request burst sent by at least one terminal and determine a burst to be transferred and a corresponding terminal to be transferred based on a signal strength of the access request burst;

a transferring unit 1102, configured to transfer the burst to be transferred determined by the receiving unit;

a first determining unit 1103, configured to determine whether the receiving unit receives a new access request burst within a time division multiple access period, notify the transferring unit to transfer the new access request burst of the terminal to be transferred if the receiving unit receives the new access request burst of the terminal to be transferred within the time division multiple access period, notify the transferring unit to transfer the new access request burst of another terminal if the receives the new access request burst of the another terminal within the time division multiple access period, and notify the transferring unit to transfer the burst to be transferred repeatedly, if the receiving unit does not receive a new access request burst within the time division multiple access period and the time division multiple access period is exceeded; and a second determining unit 1104, configured to determine whether the receiving unit receives a new access request burst within a maximum time limit after the time division multiple access period is exceeded, notify the transferring unit to stop transferring the burst to be transferred repeatedly and transfer a new access request burst of the terminal to be transferred if the repeater receives the new access request burst of the terminal to be transferred within the preset maximum time limit, notify the transferring unit to stop transferring the burst to be transferred repeatedly and transfer a new access request burst of another terminal if the repeater receives the new access request burst of the another terminal within the maximum time limit, and notify the transferring unit to stop transferring the burst to be transferred repeatedly and send an idle burst, if the repeater does not receive a new access request burst within the maximum time limit and the maximum time limit is exceeded.

The Twelfth Embodiment

Figure 19:
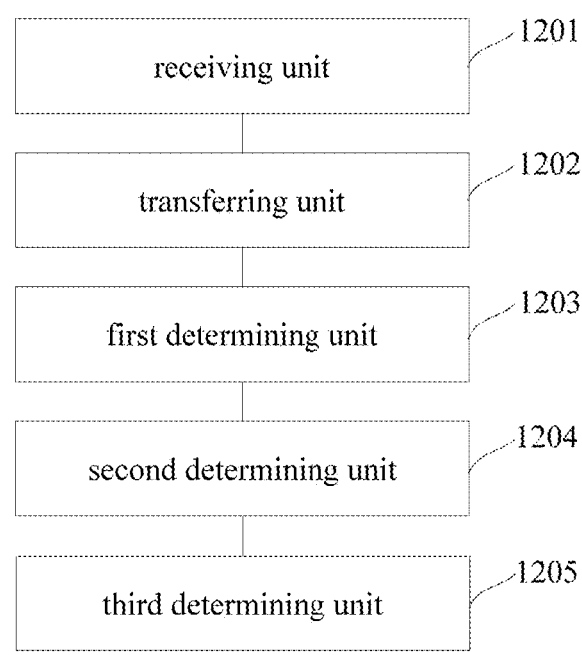
FIG. 19 is a schematic diagram of a third embodiment of a repeater according to the disclosure.

FIG. 19 is a schematic diagram of a third embodiment of a repeater according to the disclosure. The repeater may include:

a receiving unit 1201, configured to receive an access request burst sent by at least one terminal and determine a burst to be transferred and a corresponding terminal to be transferred based on a signal strength of the access request burst;

a transferring unit 1202, configured to transfer the burst to be transferred determined by the receiving unit;

a first determining unit 1203, configured to determine whether the receiving unit receives a new access request burst within a time division multiple access period, notify the transferring unit to transfer a new access request burst of the terminal to be transferred if the receiving unit receives the new access request burst of the terminal to be transferred within the time division multiple access period, notify the transferring unit to transfer a new access request burst of another terminal if the receives the new access request burst of the another terminal within the time division multiple access period, and notify the transferring unit to transfer the burst to be transferred repeatedly, if the receiving unit does not receive a new access request burst within the time division multiple access period and the time division multiple access period is exceeded; and a second determining unit 1204, configured to determine whether the receiving unit receives a new access request burst within a maximum time limit after the time division multiple access period is exceeded; and a third determining unit 1205, configured to determine whether a channel reserve time is exceeded after the receiving unit receives the new access request burst sent by the another terminal, where the channel reserve time is less than the maximum time limit, where the transferring unit discards the new access request burst and continues to transfer the burst to be transferred repeatedly if the channel reserve time is not exceeded, and the transferring unit stops transferring the burst to be transferred repeatedly and transfers the new access request burst sent by the another terminal if the channel reserve time is exceeded and the maximum time limit is not exceeded.

It is understood that the disclosure may be applied to various universal or dedicated computation environments or configurations, such as a personal computer, a server computer, a handhold or portable device, a tablet device, a multiprocessor system, a microprocessor-based system, a set-top box, a programmable consumer electronic device, a network PC, a minicomputer, a mainframe computer, and a distributed computation environment including any one of the systems or devices above.

The disclosure can be described in a general context of computer executable instructions which are executed by a computer, for example a program module. Generally, the computer module includes routines, programs, objects, modules and data structures which perform specific tasks or implement specific abstract data types. The disclosure can be performed in a distributed computation environment, and in the distributed computation environment, and tasks can be performed by a remote processing device connected through a communications network. In the distributed computation environment, the program module may be stored in a storage device of a local computer or a remote computer, such as a storage medium.

It should be noted that, a relationship term such as "the first" and "the second" herein is only used to distinguish one entity or operation from another entity or operation, and does not necessarily acquire or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

Since the device embodiments mainly correspond to the method embodiments, the device embodiments may refer to method embodiment for same or similar parts. The embodiments of the device are only illustrative, the units described as separate parts may or may not be physically separated and may or may not be a physical element, which can be located in one place or can be distributed on multiple network units. A part or all of the units is chosen as required to achieve the object of the solutions in the embodiments. Those skilled in the art can understand and perform the disclosure without any creative work.

The foregoing embodiments are only preferred embodiments of the disclosure. Those of skills in the art may make some variations and improvements on the technical solutions of the disclosure without departing from the scope of the technical solutions. All variations and improvements made based on the technical essence of the disclosure without departing from content of the technical solutions of the disclosure fall in the scope of the technical solutions of the disclosure.

The invention claimed is:

1. A call collision processing method, comprising:
receiving, by a repeater, an access request burst sent by at least one terminal, and determining, by the repeater, a corresponding terminal to be transferred based on a signal strength of the access request burst;
transferring, by the repeater, the access request burst, and determining, by the repeater, whether the repeater receives a new access request burst within a time division multiple access period;
transferring, by the repeater, a new access request burst sent by the terminal to be transferred if the repeater receives the new access request burst sent by the terminal to be transferred within the preset time division multiple access period;
transferring, by the repeater, a new access request burst sent by another terminal if the repeater receives the new access request sent by the another terminal within the preset time division multiple access period; and
transferring, by the repeater, the access request burst repeatedly, if the repeater does not receive a new access request burst within the time division multiple access period and the time division multiple access period is exceeded.

2. The method according to claim 1, wherein after the time division multiple access period is exceeded, the method further comprises:
determining whether the repeater receives a new access request burst within a maximum time limit;
stopping, by the repeater, transferring the access request burst repeatedly and transferring, by the repeater, a new access request burst of the terminal to be transferred, if the repeater receives the new access request burst of the terminal to be transferred within the maximum time limit;
stopping, by the repeater, transferring the access request burst repeatedly and transferring, by the repeater, a new access request burst of another terminal if the repeater receives the new access request burst of the another terminal within the maximum time limit; and
stopping, by the repeater, transferring the access request burst repeatedly and sending, by the repeater, an idle burst if the repeater does not receive a new access request burst within the maximum time limit.

3. The method according to claim 2, further comprising setting a channel reserving time for the terminal to be transferred, wherein the channel reserving time is less than the maximum time limit,
- wherein the stopping, by the repeater, transferring the access request burst repeatedly and transferring, by the repeater, the new access request burst of the another terminal comprises:
- determining, by the repeater, whether the channel reserving time is exceeded after receiving the new access request burst of the another terminal;
- discarding, by the repeater, the new access request burst and proceeding to transfer the access request burst repeatedly if the channel reserving time is not exceeded; and
- stopping, by the repeater, transferring the access request burst repeatedly and transferring, by the repeater, the new access request burst sent by the another terminal, if the channel reserving time is exceeded and the maximum time limit is not exceeded.

4. A repeater, comprising:
- a receiving processor, configured to receive an access request burst sent by at least one terminal and determine a corresponding terminal to be transferred based on a signal strength of the access request burst;
- a transferring processor, configured to transfer the access request burst determined by the receiving processor; and
- a first determining processor, configured to determine whether the receiving processor receives a new access request burst within a time division multiple access period,
- notify the transferring processor to transfer a new access request burst of the terminal to be transferred if the receiving processor receives the new access request burst of the terminal to be transferred within the time division multiple access period,
- notify the transferring processor to transfer a new access request burst of another terminal if the receiving processor receives the new access request burst of the another terminal within the time division multiple access period, and
- notify the transferring processor to transfer the access request burst repeatedly, if the receiving processor does not receive a new access request burst within the time division multiple access period and the time division multiple access period is exceeded.

5. The repeater according to claim 4, further comprising:
- a second determining processor, configured to determine whether the receiving processor receives a new access request burst within a maximum time limit after the time division multiple access period is exceeded,
- notify the transferring processor to stop transferring the access request burst repeatedly and transfer a new access request burst of the terminal to be transferred if the repeater receives the new access request burst of the terminal to be transferred within the preset maximum time limit,
- notify the transferring processor to stop transferring the access request burst repeatedly and transfer a new access request burst of another terminal if the repeater receives the new access request burst of the another terminal within the maximum time limit, and
- notify the transferring processor to stop transferring the access request burst repeatedly and send an idle burst, if the repeater does not receive a new access request burst within the maximum time limit and the maximum time limit is exceeded.

6. The repeater according to claim 5, wherein a channel reserving time is set for the terminal and the channel reserving time is less than the maximum time limit, wherein the repeater further comprises:
- a third determining processor, configured to determine whether the channel reserving time is exceeded after the receiving processor receives the new access request burst sent by another terminal,
- wherein the transferring processor discards the new access request burst and continues to transfer the access request burst repeatedly if the channel reserving time is not exceeded, and
- the transferring processor stops transferring the access request burst repeatedly and transfers the new access request burst sent by the another terminal, if the channel reserving time is exceeded and the maximum time limit is not exceeded.

* * * * *